April 19, 1927.
A. R. BRADEN
ART OF MAKING DIES
Filed Jan. 9, 1922
1,624,920
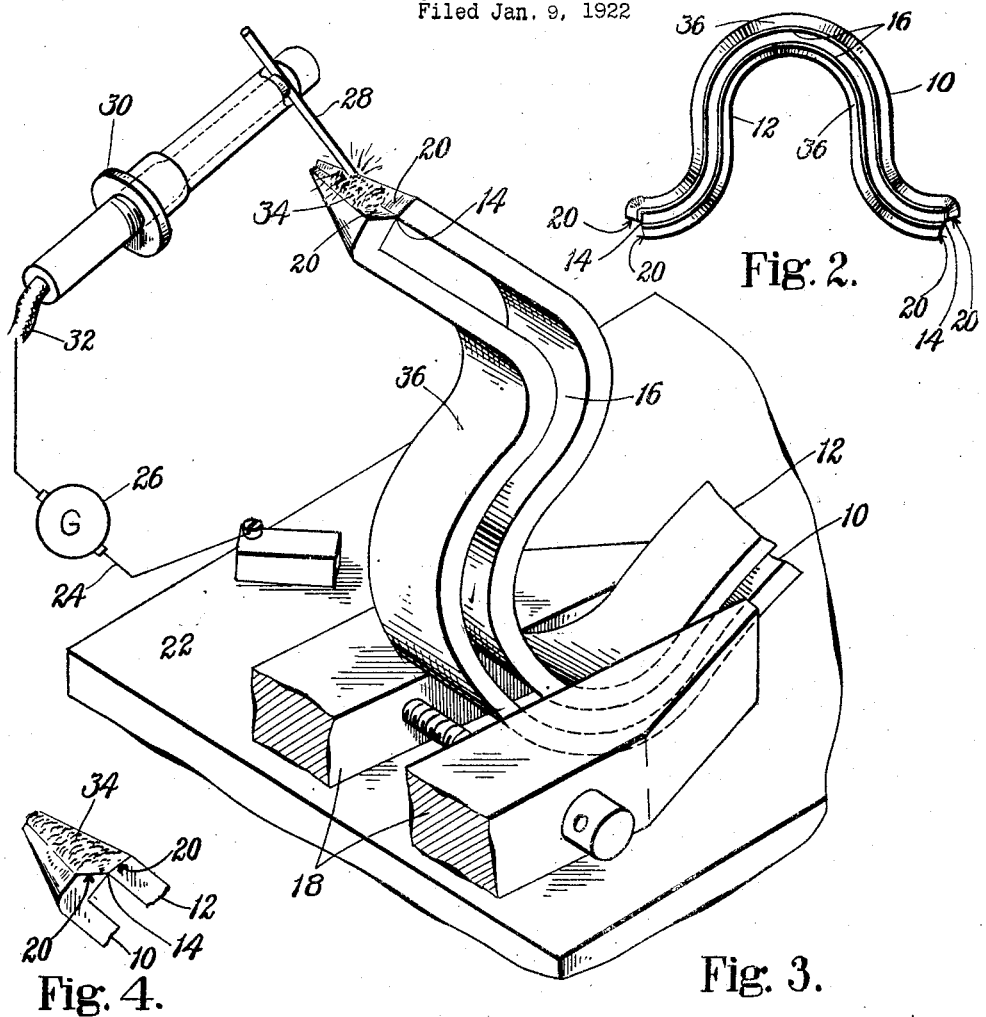
Fig. 2.
Fig. 3.
Fig. 4.
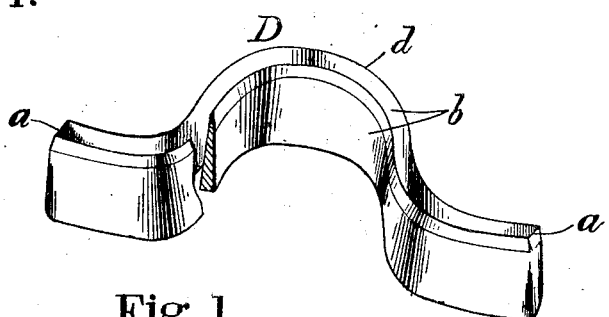
Fig. 1.
INVENTOR.
Albert R. Braden
By his Attorney,
Nelson W. Howard Patented Apr. 19, 1927.

1,624,920

UNITED STATES PATENT OFFICE.

ALBERT R. BRADEN, OF BEVERLY, MASSACHUSETTS, ASSIGNOR TO UNITED SHOE MACHINERY CORPORATION, OF PATERSON, NEW JERSEY, A CORPORATION OF NEW JERSEY.

ART OF MAKING DIES.

Application filed January 9, 1922. Serial No. 528,012.

This invention relates to methods of making dies, and concerns particularly that type known as clicking dies, which are employed for cutting out various materials, for example the thinner portions of shoe-stock, as those which enter into the construction of the upper. These dies are customarily formed by bending to a templet a steel strip, which is triangular in cross-section, the apex of the triangle furnishing the cutting edge, and the base providing the surface to which pressure is applied to force the edge through the work. The adjacent ends of the stock, after bending, are welded together to complete the closed form of the die. When the pattern to be cut presents sharp curves or angles, the bending of the die-stock tends to so distort the cutting edge that it is difficult to bring it to the contour of the templet. This tendency is accentuated by the cross-sectional form of the stock, which, at its thicker portion or base, is stretched at one side and compressed at the other. Moreover, in thus operating, the metal is strained at the angles and the die weakened, so that it is liable to break in use. A further difficulty arises when the form of the die is such that the opposite sides are close together. In this case, it may be impossible to introduce a bending tool or welding fixture between the sides, and the usual practice is to mill out the die from a solid bar or block of steel. This, of course, greatly increases the cost of production.

In view of the conditions just stated, my invention has as an object the provision of a method of die-making, by which even the narrowest dies may be formed by bending, and, whatsoever the contour or size, the forming operations may readily be carried out and injurious effect upon the stock minimized. The more essential steps of my improved method consists in forming a plurality of separate die-sections out of die-stock, each with its edge of the same contour and length that it is to have in the finished die, assembling the formed sections with their edges coinciding with the contour of the finished die, temporarily securing against relative movement the sections so assembled, and joining the ends of said sections by welding while they remain so secured. Preferably, the abutting ends are at points at which there are abrupt changes in contour, so that bending of the stock is here entirely avoided. They are connected by welding, as by the use of an electric arc, joining the parts by the introduction of high-carbon steel between them, which will not only complete the continuity of the die, but will furnish a cutting edge at the joined portion resistive to dulling.

One form of the die produced by my method and steps in its fabrication are illustrated in the accompanying drawing, Figure 1 showing the completed die in perspective, with a portion broken away;

Fig. 2 being a top plan view of the opposite sections, assembled before connecting;

Fig. 3 showing in perspective the succeeding step of clamping and joining the adjacent ends; and Fig. 4 similarly illustrating the connection between such ends before the die is completed by grinding.

There appears at D, in Fig. 1 of the drawing, that type of die which would be produced ordinarily by milling from solid stock, the end walls $a$, $a$ being so short that there is not space between the opposite sides $b$, $b$ to permit the introduction of bending tools and welding fixtures. In proceeding in accordance with the present invention, this die is first formed in two independent sections 10 and 12, which may, without difficulty, be bent to a templet in any desired manner. The contour of the thus-bent sections is such that when they are assembled, as is illustrated in Fig. 2, with the inner edges of the opposite extremities placed in contact at 14, 14, the inner wall 16 of the entire die will have the form of the templet, and therefore of the piece which is to be cut by the die, their aggregate length being equal to the circumference of the completed die. In this relation the sections are fixed, as by a clamp 18 (Fig. 3). The adjacent end faces 20, 20 of the sections are preferably so inclined as to furnish a V-shaped or trough-like depression with upwardly diverging walls, the bottom of which depression is closed by the line of contact of the inner walls 16 at 14. The sections are now connected at the upturned ends by joining thereto a suitable metal, as high-carbon steel. Though this may be accomplished in other ways, it is effectively performed by arc-welding, the clamp 18 with its supporting table 22 being of metal, and furnishing with the die one terminal of a circuit 24 containing a source 26 of electrical energy. The opposite terminal 28 of this circuit consists of the welding material fixed in a holder 30, with an insulated handle to be grasped by the operator. The holder is connected to the circuit 24 by a flexible conductor 32 to facilitate the manipulation of the electrode.

The generating circuit being closed, the operator brings the electrode 28 into contact with the work at the depression 20, 20, and separates it to form an arc. The heat of this melts the electrode and at the same time raises the walls 20, 20 to welding temperature, so that the molten metal flowing from the electrode gathers at 34 and produces, between the ends of the sections held in unvarying relation, a permanent joint homogeneous with respect to the sections. Having effected the connection of both ends of the sections in this manner, the die may be finished by grinding the external surface 36 to produce the cutting edge $d$, this coinciding with the edge of the inner wall 16 at the apex of the stock. Since this, as already pointed out, is identical in contour with the templet, it is unnecessary to operate within the die, except perhaps to file away such small amounts of the electrode-metal as may pass between the sections along the lines 14. With this construction, it will be seen that the stock may be bent very accurately and expeditiously, with complete freedom to apply the bending tools, and the portions operated on at one time having little tendency to react upon and deform other portions previously formed, as might be the case were the entire outline of the die to be continuous during bending.

Having described my invention, what I claim as new and desire to secure by Letters Patent of the United States is:

1. The method of making a die, which consists in forming a plurality of separate die-sections out of die-stock, each with its edge of the same contour and length that it is to have in the finished die, assembling said formed sections with their edges coinciding with the contour of the finished die, temporarily securing against relative movement the sections so assembled, and joining the ends of said sections by welding while said sections remain so secured.

2. The method of making a die, which consists in forming a plurality of separate die-sections out of die-stock, each with its edge of the same contour and length that it is to have in the finished die, and with its ends situated at points at which there are abrupt changes in the contour of said die, the faces of said ends being inclined, assembling said formed sections with their edges coinciding with the contour of the finished die and with their said end faces diverging from the line of contact to furnish a receiving depression, temporarily securing against relative movement the sections so assembled, and joining the ends of said sections by arc-welding with a high-carbon steel electrode while said sections remain so secured, thereby depositing the material of the electrode in said depression.

In testimony whereof I have signed my name to this specification.

ALBERT R. BRADEN.